United States Patent Office 3,041,518
Patented June 26, 1962

3,041,518
FOLLOW-UP INSTALLATION FOR POSITIONING A MOVABLE MEMBER
Åke Hugo Petrus Blomqvist, Johanneshov, and Rolf Bengt Olov Hansson, Stockholm, Sweden, assignors to Aktiebolaget Bofors, Bofors, Sweden, a company of Sweden
Filed Sept. 30, 1959, Ser. No. 843,547
Claims priority, application Sweden Oct. 3, 1958
6 Claims. (Cl. 318—448)

This invention relates to installations including a fire-control instrument and one or more servo systems connected to the fire-control instrument.

In installations of this kind, the fire-control instrument constitutes a control or pilot member which controls the position of a controlled or follower member of the installation. The controlled member may be the barrel of a gun, a rocket launcher or the missile itself. Evidently, it is essential that the position of the controlled member follows closely the signals received from the fire-control instrument and at adequately high speed. Similar accuracy and speed of the positioning of the follower member are required in many fields of application other than ordnance.

Servo systems as heretofore known, can be made very accurate but high and rapid positioning accuracy entails a very complex and not too reliable servo system.

Furthermore, it is often desirable in installations of the general kind above referred to, to provide a numeral digital computer in the fire-control instrument. A computer of that kind cannot coact with a standard servo system, but must be coupled with so-called sampling servo systems. Such sampling servo systems are described, for instance, in the book "Control Engineers' Handbook," New York, 1958, pages 2.57 to 2.66, by J. G. Truxal. A sampling servo system generally requires approximately 100 samplings per second to obtain the required followup correspondence. It has been found that with such high sampling frequencies, it is difficult for the fire-control instrument to operate sufficiently rapid to carry out all the calculations to be made.

Broadly, it is an object of the present invention to provide an installation of the general kind above referred to, which is highly accurate, rapid in its operation and comparatively simple in design.

A more specific object of the invention is to provide an installation which is capable of producing the required accuracy on the basis of a substantially reduced sampling frequency.

According to the invention, the aforementioned objects, features and advantages and other objects, features and advantages which will be pointed out hereinafter, are attained by providing in an installation including a fire-control instrument and one or more servo systems controlled by the fire-control instrument and in turn controlling a common controlled member such as gun barrel or a missile launcher in several planes of movement, one or several servo systems each of which causes setting of the controlled member at each moment of time in coincidence with the setting of the fire-control instrument, but with a predetermined displacement in time, and by also providing that the fire-control instrument will propagate data which are displaced at each moment of time from the aforementioned displacement in time by the same displacement but in opposite direction in reference to the first mentioned displacement in time.

The displacement in time in a servo system according to the invention may be obtained by providing a conventional servo system with a specific feed back circuit which will feed back a quantity of acceleration characteristics and also by modifying the characteristics of the conventional servo system.

In the event the servo motor of the system is an electric motor only, the relation between current and torque of the motor may be altered, the moment of inertia of the motor, or other characteristics of the motor. It is also possible to modify several characteristics of the motor at the same time. In the event the servo motor of the system is a more complex assembly such as an electro-hydraulic unit including an electric motor, a hydraulic variable speed gear equipped with control devices such as a pilot magnet, a pilot valve, etc., the characteristics of the servo motor may be modified, for instance, by changing some of the ratios involved, such as the lengths of the linkages used, the dimensions of the pilot valve, the dimensions of the pistons, valves, etc. in the hydraulic speed gear, or also by changing the characteristics of the electric motor in the manner previously described. It is, of course, also possible to attain the desired modifications by modifying any suitable parts of the assembly. The desired time displacement can also be attained by providing a filter network in an error signal channel of the installation.

The aforedescribed ways of attaining the desired time displacement can be combined in one installation. If a digital computer is used in the installation, the installation will comprise a so-called maintenance circuit. This circuit can be utilized to achieve the desired delay, but such manner of obtaining the delay can be used only in combination with one or several of the described arrangements.

In the event an installation according to the invention is used for aiming a missile at a fast moving aircraft, the time displacement in the servo system used in the installation should not exceed 0.5 second if the desired accuracy is to be attained, that is, if an error margin of approximately 4% is to be maintained. In order to determine the aforementioned percentage, a sinusoidal oscillation having a cycle time of 6.3 seconds is transmitted to the servo system. The percentage then refers to the amplitude of the signal. In the event the installation is used for aiming a missile upon a surface vessel, a time displacement up to 5 seconds is generally acceptable.

The invention will now be more fully described in connection with the accompanying drawing.

Figure 1:
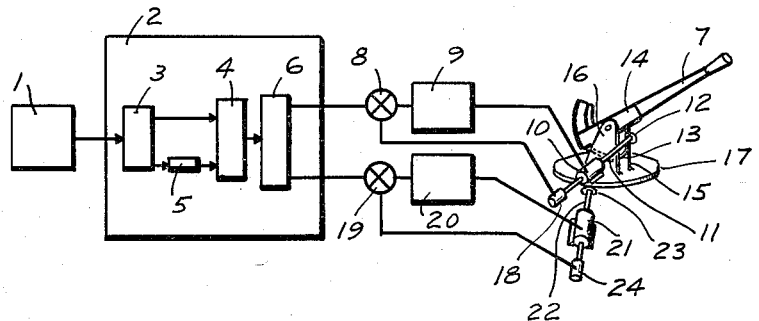
FIG. 1 is a diagram of an installation according to the prior art.

The installation according to FIG. 1 comprises a sight 1 which may be visualized as an optical sight or a radar type sight of conventional design. A sight of this kind serves to locate an object in space. However, the sight 1 may also be visualized as an instrumentality suitable for determining the location of an object which is not visible, such as a submerged submarine. The design of the sight as used in the installation does not constitute part of the invention and is hence not described in detail.

Sight 1 indicates in polar coordinates the position of the object. Said coordinates are fed to a fire-control instrument 2, which comprises a coordinate converter 3 for converting the polar coordinates into cartesian coordinates. These coordinates are transmitted to a hitting point computer 4 and further to a unit 5 which calculates the speed of each of the cartesian coordinates and said speeds are fed from the unit 5 to the hitting point computer 4. The hitting point computer 4, in turn, is connected to a coordinate converter 6 which from the cartesian coordinates thus obtained forms the angle of traverse and the angle of elevation for which a controlled member 7 shown as a gun barrel is to be set. Member 7 may also be a launching device for rockets and missiles, or the controlled member may be the missile itself. In the shown embodiment, the controlling member comprises the sight 1 and the fire-control instrument 2. The angle of elevation value from the coordinate converter 6 is transmitted to a differential unit 8 of a servo system for elevation of barrel 7. The differential unit is connected to an amplifier 9 the output signal of which is transmitted to a servo motor 10. The shaft 11 of said servo motor is connected at its upper end to a gear 12 which is in mesh with a gear arc 13 fastened to the breech ring 14 of the barrel. The breech ring 14 is tiltably supported in two supporting uprights 15 and 16 which, in turn, are fastened to a rotatable disc 17. A position transmitter 18, e.g. a synchronizing unit is mechanically coupled to the servo motor 10 and electrically connected to the differential unit 8. The angle of traverse from the fire-control instrument 2 is transmitted to a differential unit 19 of a servo system for traversing the barrel 7. The differential unit is connected to an amplifier 20 the output signal of which is transmitted to a servo motor 21. The shaft 22 of the servo motor has at its upper end a bevel gear 23 which engages a toothed rim on disc 17. The servo motor 21 is coupled to a position transmitting member 24 which is connected to the differential unit 19.

In this arrangement, it is assumed that the sight, the fire-control instrument and the two servo systems are conventional. As is now apparent, sight 1 and the components included in box 2 constitute a control member and the gun barrel 7 a controlled member. The two servo systems comprise components 8, 9, 10 and 19, 20, 21 respectively. The servo systems are so designed that the controlled member i.e. the barrel at every moment and with great accuracy moves into the position indicated by the fire-control instrument. As stated before, accurate servo systems are inherently very complicated.

Figure 2:
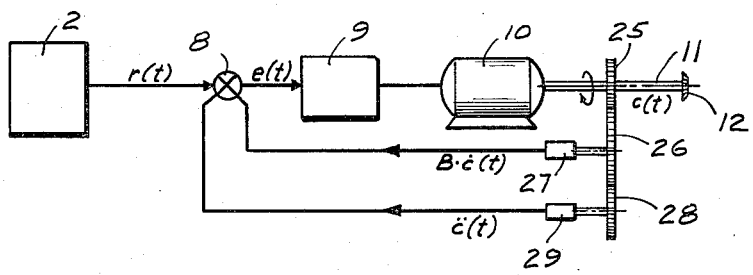
FIG. 2 is a block diagram of the modifications made in accordance with the invention in the prior art installation of FIG. 1.

Turning now to FIG. 2, the fire-control instrument according to this figure is so designed that it indicates momentary positions of an object at a moment of time which differs T units of time from the moment of time at which the instrument transmits its values. In other words, the fire-control instrument transmits data which the object will have at a predetermined future, that is, the fire-control instrument predicts. The said prediction is necessary, as a certain amount of time is required for a projectile fired from the barrel to reach the object. The above-mentioned time T for aircraft usually has a value of between 1–10 seconds, but for ships this value may be 10 times greater. By increasing the prediction by a certain value, the correspondence in the servo system can be reduced by the corresponding time. This affords the advantage that the servo systems may be made considerably simpler. In the event the fire-control instrument comprises an electronic digital computer, the sampling frequency may be reduced to approximately 10 samplings per second when the target is an aircraft and to approximately a few samplings per second when the target is a ship. It has been found that the prediction of the fire-control instrument needs to be increased by 0.5 second in order to achieve the accuracy desired in certain cases. In other cases it is advisable further to increase the said time, but practical tests have shown that it is useless to increase the prediction time by more than approximately 5 seconds.

It is not described in detail how to increase the prediction time of a fire-control instrument, as this is generally known to experts in the field.

It is assumed that the fire-control instrument 2 in FIG. 1 has a certain prediction time corresponding to the time required for a projectile to travel from the barrel to the object it is intended to reach. It is further assumed that the fire-control instrument has an additional prediction of a value $T_L$.

In the following an example will be described how in each of the two servo systems in FIG. 1 a time displacement $T_L$ between the values supplied and the values set may be attained. However, the operation for one of the servo systems only will be described, as the operation for the other servo system would be a repetition.

In FIG. 2 a servo system for elevation is shown which has been modified in accordance with the invention. From the fire-control instrument 2 a signal $r(t)$ is fed to the differential unit 8, which transmits a signal $e(t)$. This signal is transmitted to the amplifier 9. The output signal for the amplifier 9 is fed to the servo motor 10 the shaft 11 of which obtains a movement corresponding to the function $c(t)$. The shaft 11 mounts at its upper end a bevel gear 12 to mesh with the aforementioned gear arc 13 of FIG. 1. The shaft also mounts a gear wheel 25 which is in mesh with a gear 26. The last mentioned gear is connected to a member 27 indicating the speed of the shaft 11. Said member comprises a so-called tachometer. The member transmits a signal $B\dot{c}(t)$ which is transmitted to the differential unit 8. The gear 26, in turn, engages a gear wheel 28 is connected to a position indicating member 29 for instance a synchronizing unit which generates a signal of the character $c(t)$. This signal is transmitted to the differential unit 8. Thus tachometer 29 and the connections thereof just described constitute a feedback circuit. It is further assumed that the servo system is of such a kind that the shaft 11 of the servo motor 10 for the signal transmitted by the amplifier 9 obtains an acceleration $\ddot{c}(t)$ proportional to the generated signal. Hence:

$$e(t) = A \cdot \ddot{c}(t) \qquad (1)$$

where the quantity A is determined by the amplification of the amplifier and the properties of the servo motor which are adapted in the way previously indicated. The aforementioned constant B is determined by the ratio between the gear 25 and 26 and by the tachometer itself. The value of the generated voltage is then the critical magnitude. The magnitude of the voltage may be controlled by the used coil windings.

For the signals which are transmitted to the differential unit, the following relation is applicable:

$$r(t) - c(t) - B\dot{c}(t) = e(t) = A \cdot \ddot{c}(t) \qquad (2)$$

or $$r(t) = c(t) + B\dot{c}(t) + A \cdot \ddot{c}(t) \qquad (3)$$

The ratio to the tachometer 27 is selected so that B obtains the value $T_L$, where $T_L$ is the previously mentioned time displacement and the amplification in the amplifier 9 whereby the constant A obtains a value of ½ $T_L^2$. The last mentioned equation then becomes as follows:

$$r(t) = c(t) + T_L \dot{c}(t) + \frac{T_L^2}{2} \ddot{c}(t) \qquad (4)$$

By using Taylor's theorem with Lagrange's remainder term the equation can be re-written as:

$$r(t) = c(t + T_L) + \frac{T_L^3}{6} \dddot{c}(T + \theta T_L) \qquad (5)$$

In the last mentioned equation $\theta$ has a value between 0 and 1. In view of the value allotted to $T_L$ according to the foregoing, the third term in the last equation will be negligible, so that the equation may be written:

$$r(t) = c(t + T_L) \qquad (6)$$

As is now apparent, dimensioning of the servo amplifier and the arrangement of the tachometer generator results in a time displacement equal to the additional prediction $T_L$ which has been obtained by means of the fire-control instrument.

Due to the obtained time displacement, the limit frequency for the servo system is reduced whereby more simple components can be used. This affords the advantage of a considerable reduction of the costs of a servo system which has to have a certain predetermined accuracy.

In servo systems of the kind shown in FIG. 2, the elements may be laid out with the aid of the above mentioned equations. For servo systems of other constructions it is more appropriate to utilize the Laplace transformation. The manner in which this transformation is used is described more in detail in said book by Truxal, on pages 1-22 to 1-34.

The transmission function achieved by means of the present invention according to Equation 6, when the designations used in said book are utilized, will be as follows:

$$C(s) = R(s) \cdot e^{-sT_L} \qquad (7)$$

in which $C(s)$ = Laplace transformation of $c(t)$
in which $R(s)$ = Laplace transformation of $r(t)$
in which $s$ = the complex variable of the Laplace transformation
in which $e$ = the base in the natural logarithm system If in the aforementioned example for dimensioning the servo system in FIG. 2, the Laplace transformation is used, the Expression 4 will be as follows:

$$R(s) = C(s) \cdot \left(1 + T_L \cdot s + \frac{T_L^2}{2} \cdot s^2\right) \qquad (8)$$

If series development is applied to $e^{sT_L}$, the following relation is obtained, as the term of the third degree which corresponds to the remainder term in the Expression 4 is neglected because of the value chosen of $T_L$:

$$R(s) = C(s) \cdot e^{sT_L} \qquad (9)$$

or $$C(s) = R(s) \cdot e^{-sT_L} \qquad (7)$$

which is the desired relation.

Another example of designing a delaying servo system in which the Laplace transformation is used will now be described, to wit, a sampling servo system provided with a so-called maintenance circuit. The transmission function of such a maintenance circuit is explained in said book of Truxal on pages 2-60. The maintenance circuit is placed in series between the fire-control instrument 2 and a differential unit e.g. 8, whereby the Laplace transformation for $r(t)$ is changed to:

$$\frac{1 - e^{sT_I}}{sT_I} \cdot R(s) \qquad (10)$$

where $T_I$ = the sampling interval.

In other respects, the servo system is constructed in the same way as the system shown in FIG. 2, and thus the following equation is applicable:

$$\frac{1 - e^{-sT_I}}{sT_I} \cdot R(s) = C(s) \cdot (1 + Bs + As^2) \qquad (11)$$

where the constants A and B have the significance previously mentioned.

If the known series development of the exponential function is used in the above mentioned equation, the equation will obtain the following form:

$$\left(1 - \frac{sT_I}{2} + \frac{s^2 T_I^2}{6}\right) \cdot R(s) = C(s) \cdot (1 + Bs + As^2) \qquad (12)$$

or $$C(s) = R(s)\left[1 - s\left(B + \frac{T_I}{2}\right) + s^2\left(\frac{BT_I}{2} + \frac{T_I^2}{6} + B^2 - A\right)\right] \qquad (13)$$

In the last mentioned equation, terms containing $s^3$ and higher powers of $s$ can be neglected for the same reason as previously, if the ratio to the tachometer is so chosen that the constant B has the following value:

$$B = T_L - \frac{T_I}{2}$$

and if the amplification of the amplifier is so chosen that the constant A has the following value:

$$A = \frac{T_L^2}{2} + \frac{T_I^2}{6} = \frac{T_I T_L}{2} \qquad (15)$$

and if said values of A and B are inserted in the Equation 13 this equation will be:

$$C(s) = R(s) \cdot \left(1 - sT_L + \frac{s^2 T_L^2}{2}\right) = R(s) \cdot e^{-sT_L} \qquad (16)$$

which comprises the relation desired. Terms containing $s^3$ and higher powers of $s$ have, as previously, been neglected.

Figure 3:
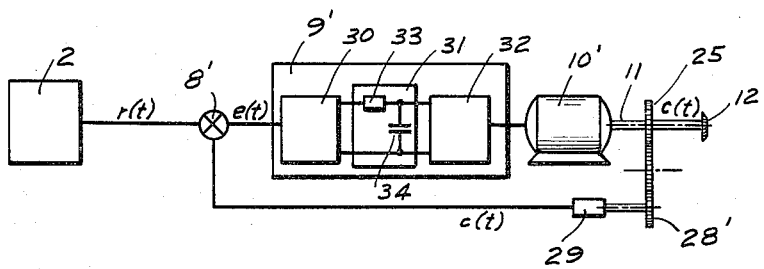
FIG. 3 is a block diagram of a further modification according to the invention made in the installation according to FIG. 1.

The third of the previously mentioned operations of achieving the delay will be described in conjunction with FIG. 3, where the members which are identical to the corresponding members in FIG. 2 have been designated by the same reference numerals.

From the fire-control instrument 2 a signal $(r)t$ is fed to the differential unit 8'. This signal is transmitted to the amplifier 9', which comprises three parts, viz.: the amplifier 30, the filter network 31 and the end amplifier 32. The output signal from the end amplifier 32 is fed to the servo motor 10', the shaft 11 of which moves corresponding to the function $c(t)$. At its upper end the shaft 11 mounts a bevel gear 12 in mesh with the previously mentioned gear arc 13. The shaft 11 further mounts a gear 25 which is in mesh with a gear 28' connected to a position-indicating member 29, e.g. a synchronizing device which propagates a signal of the character $c(t)$. This signal is transmitted to the differential unit 8', the output signal of which is designated $e(t)$. The servo motor 10' is in this case of such a kind that its shaft 11, for a certain signal from the end amplifier 32 obtains a speed $\dot{c}(t)$ which is proportional to the propagated signal. The filter network 31 comprises a resistance 33 connected in series and a condenser 34 shunt-connected subsequent this resistance. The value of the resistance is $R_1$ and the value of the condenser is $C_1$. This network has a transmission function which with the aid of the Laplace transformation can be expressed as:

$$\frac{1}{1 + sR_1C_1} \qquad (17)$$

The following relation is applicable between the Laplace transformation $e(s)$ for the signal $e(t)$ and the Laplace transformation $s \cdot C(s)$ for the speed of the shaft 11:

$$A \cdot sC(s) = \frac{1}{1 + sR_1C_1} \cdot E(s) \qquad (18)$$

where the constant A is determined by the amplification of the amplifiers 30 and 32 and the characteristics of the servo motor 10'. Further, the differential unit 8' has such a function that the following relation is applicable for its output signal:

$$E(s) = R(s) - C(s) \qquad (19)$$

From the Equations 18 and 19 the following relation is obtained between $R(s)$ and $C(s)$:

$$R(s) = C(s) \cdot (1 + As + AR_1C_1s^2) \qquad (20)$$

When the amplification of the amplifiers 30 and 32 is such that the constant A is equal to $T_L$, and the condenser $C_1$ and the resistance $R_1$ are selected so that the product of $R_1 \cdot C_1$ is equal to $\frac{1}{2}T_L$ the Equation 20 will correspond to the equation:

$$C(s) = R(s) \cdot e^{-sT_L} \qquad (7)$$

if its exponential function is series developed and if, as previously, terms containing $s^3$ and higher powers of $s$ have been neglected.

The servo systems described above can be modified in many different ways. In the servo system according to FIG. 3, for instance, the filter network 31 can be eliminated. The following relation will then be obtained:

$$R(s) = C(s) \cdot (1 + T_L \cdot s) \qquad (21)$$

This equation will be equivalent to the equation desired:

$$C(s) = R(s) e^{-sT_L} \qquad (7)$$

if the terms containing $s^2$ in the series development for the exponential function, can also be neglected. It has been found that this gives sufficiently good accuracy in certain cases, when the time $T_L$ is short, or when such high accuracy is not required. When better accuracy is desired, this can be achieved by using any of the systems previously described. In these cases it has been found that sufficient accuracy can be achieved when conformity is achieved as to the third degree term in the series development of the exponential function. This can be carried out through a combination of two of the designs described, viz. a servo system can be provided with both a tachometer generator and with an electrical circuit in the amplifier. A further modification of the servo system can be achieved by utilizing a servo motor with such a transmission function that the following relation will be applicable:

$$A \cdot sC(s) = \frac{1}{1+sT_M} \cdot E(s) \qquad (22)$$

In this case it will easily be realized that the electrical circuit 31 is not required if the constant $T_M$, which is usually called the motor-time constant, is given the value of ½ $T_L$.

What is claimed is:

1. In a follow-up installation including a fire-control system as control member, a movable controlled member and a servo system connecting the control member to the controlled member for setting the controlled member in accordance with the setting of the control member, the improvement comprising a servo system responsive to electrical signals from a controlling fire-control system at each moment of time with a predetermined delay therebetween and a controlling fire-control system arranged to propagate at each moment of time electrical signals controlling the servo system, said signals being preselected to have said servo motor follow in an opposite direction from the position resulting from said predetermined delay to have the controlled member at a preselected position at a preselected time.

2. In an installation according to claim 1 for aiming at airborne targets, in which said fire-control system and said servo system are arranged to effect predetermined delays having a value between 0.05 and 0.5 second.

3. In an installation according to claim 1 for aiming at seaborne targets, in which said fire-control system and said servo system are arranged to effect predetermined delay having a value between 0.1 and 5 seconds.

4. In an installation according to claim 1, in which said servo system comprises an error signal channel and an electrical filter network included in said channel, said filter network effecting the predetermined delay of the servo system.

5. In an installation according to claim 1, in which said servo system comprises a servo motor arranged to effect said predetermined delay.

6. In an installation according to claim 1, in which said servo system comprises a servo motor and a feedback circuit including a tachometer connected to the servo motor, said feedback circuit effecting said predetermined delay.

References Cited in the file of this patent

UNITED STATES PATENTS

| | | |
|---|---|---|
| 1,988,458 | Minorsky | Jan. 22, 1935 |
| 2,405,047 | Newell | July 30, 1946 |
| 2,415,849 | Halpert et al. | Feb. 18, 1947 |
| 2,426,597 | Chafee | Sept. 2, 1947 |
| 2,446,567 | White et al. | Aug. 10, 1948 |
| 2,473,235 | Alexanderson et al. | June 14, 1949 |
| 2,586,817 | Harris | Feb. 26, 1952 |
| 2,703,039 | White | Mar. 1, 1955 |

OTHER REFERENCES

Ahrendt, W. R.: Servomechanism Practice, page 120, Fig. 8-5, McGraw-Hill, New York, 1954.